(12) United States Patent
Azzano et al.

(10) Patent No.: US 8,893,922 B2
(45) Date of Patent: Nov. 25, 2014

(54) AUTOMATED COFFEE VENDING KIOSK AND ASSOCIATED SYSTEMS

(71) Applicants: Feniks, Inc., Seattle, WA (US);
 Outerwall Inc., Bellevue, WA (US)

(72) Inventors: Lawrence David Azzano, Seattle, WA (US); Daniel Phillips, Seattle, WA (US); Doug Edward Coppenbarger, Marysville, WA (US); Kenneth J. Redding, Bellevue, WA (US); James Michael Craig, Seattle, WA (US); Manolito Adan, Seattle, WA (US)

(*) Notice: Subject to any disclaimer, the term of this patent is extended or adjusted under 35 U.S.C. 154(b) by 0 days.

(21) Appl. No.: 13/842,368

(22) Filed: Mar. 15, 2013

(65) Prior Publication Data
US 2014/0272049 A1 Sep. 18, 2014

(51) Int. Cl.
*G07F 13/10* (2006.01)
*A47J 31/44* (2006.01)

(52) U.S. Cl.
CPC .................... *A47J 31/4403* (2013.01)
USPC .............. 221/96; 221/129; 141/174; 141/175

(58) Field of Classification Search
USPC .................. 221/96, 129.1, 129; 141/174, 175
See application file for complete search history.

(56) References Cited

U.S. PATENT DOCUMENTS

| | | | | |
|---|---|---|---|---|
| 2,000,556 A | * | 5/1935 | Brady | 194/244 |
| 2,037,688 A | * | 4/1936 | Brady | 177/76 |
| 2,571,283 A | * | 10/1951 | Nicholson | 141/174 |
| 2,643,322 A | * | 6/1953 | Lime et al. | 392/450 |
| 2,827,927 A | * | 3/1958 | Findlay | 177/52 |
| 2,907,266 A | * | 10/1959 | Moulden | 99/289 R |
| 3,349,690 A | * | 10/1967 | Heiner | 99/283 |
| 3,552,976 A | | 1/1971 | King | |
| 3,884,386 A | * | 5/1975 | Urcola | 221/7 |
| 5,261,467 A | * | 11/1993 | Yamamoto et al. | 141/174 |
| 5,957,033 A | | 9/1999 | In-Albon | |
| 6,550,637 B1 | * | 4/2003 | Erikawa | 221/92 |
| 6,675,985 B2 | * | 1/2004 | Sato et al. | 221/96 |
| 7,207,462 B2 | | 4/2007 | Gunderson et al. | |
| 7,899,713 B2 | | 3/2011 | Rothschild | |
| 8,340,815 B2 | | 12/2012 | Peters et al. | |
| 2006/0191592 A1 | * | 8/2006 | Akuzawa et al. | 141/192 |
| 2013/0022723 A1 | | 1/2013 | Azzano et al. | |
| 2013/0195433 A1 | * | 8/2013 | Magno | 392/488 |

FOREIGN PATENT DOCUMENTS

| | | | |
|---|---|---|---|
| JP | 02190996 | | 7/1990 |
| JP | 4-68493 | * | 3/1992 |
| JP | 8-221657 | * | 8/1996 |
| JP | 10275275 | | 10/1998 |
| JP | 2008-186228 | * | 8/2008 |
| JP | 2011-192054 | * | 9/2011 |

OTHER PUBLICATIONS

Future of Coffee—Introducing the BeMoved Coffee Machine concept, Douwe Egberts Coffee Systems [online], Uploaded to YouTube Oct. 13, 2009 [retrieved on Jan. 29, 2013], Retrieved from the Internet: URL: http://www.youtube.com/watch?v=ZY1uDPO_3ps.
VKI Technologies Inc. 9 oz Brewer [online], Feb. 1999, Retrieved from the Internet: URL: http://www.vkitech.com/pdf/en/brew1.pdf, 2 pages.
U.S. Appl. No. 29/449,994, filed Mar. 15, 2013, Azzano et al.

* cited by examiner

*Primary Examiner* — Anthony Weier

(57) ABSTRACT

Systems and methods for brewing coffee and producing other hot beverages are included herein. An automated coffee vending kiosk configured in accordance with one embodiment includes a coffee brewing unit for brewing coffee and a cup dispensing portion. The cup dispensing portion can include a motor and a door operably coupled to the motor. The door can be moveable between a closed position and an open position to provide access to a cup storage area having a plurality of cups. A coffee dispensing portion can be positioned to dispense the coffee into an individual cup.

4 Claims, 12 Drawing Sheets

AUTOMATED COFFEE VENDING KIOSK AND ASSOCIATED SYSTEMS

TECHNICAL FIELD

The present disclosure relates generally to systems and methods for vending brewed coffee and other hot beverages. More particularly, the systems and methods of the present disclosure are suitable for brewing and dispensing coffee and other hot beverages from an automated vending kiosk.

BACKGROUND

A variety of retail locations (e.g., gas stations, mini-marts, convenience stores, etc.) sell brewed coffee "to-go" in convenient, carry-out cups. Often, the coffee is pre-prepared and kept hot in a pot at a self-service counter. The customer pours the coffee of their choice (e.g., regular or decaf) into a cup of the desired size, and adds any desired flavorings or condiments (e.g., cream, sugar, etc.). The costs associated with brewing the coffee and maintaining the self-service counter can be prohibitive. Accordingly, some retail outlets or other locations include self-contained automatic coffee making machines that allow the customer to choose between one or more types of coffee beverages (e.g., regular, decaf, espresso, latte, cappuccino, etc.).

Existing automatic coffee machines ameliorate some of the problems inherent with providing self-service coffee. However, existing machines still suffer from relatively high operational costs and limited capabilities.

DETAILED DESCRIPTION

The following disclosure is directed generally to automatic coffee vending kiosks for brewing coffee and/or producing other hot beverages. Several details describing structures and processes that are well-known and often associated with coffee brewing machines or vending machines are not set forth in the following description to avoid unnecessarily obscuring embodiments of the disclosure. Moreover, although the following disclosure sets forth several embodiments, several other embodiments can have different configurations, arrangements, and/or components than those described herein. In particular, other embodiments may have additional elements, may have different combinations of elements, and/or may lack one or more of the elements described below with reference to FIGS. 1-6.

In the Figures, identical reference numbers identify identical or at least generally similar elements. To facilitate the discussion of any particular element, the most significant digit or digits of any reference number refer to the Figure in which that element is first introduced. For example, element 102 is first introduced and discussed with reference to FIG. 1. Moreover, the various elements and features illustrated in the Figures may not be drawn to scale.

Figure 1:
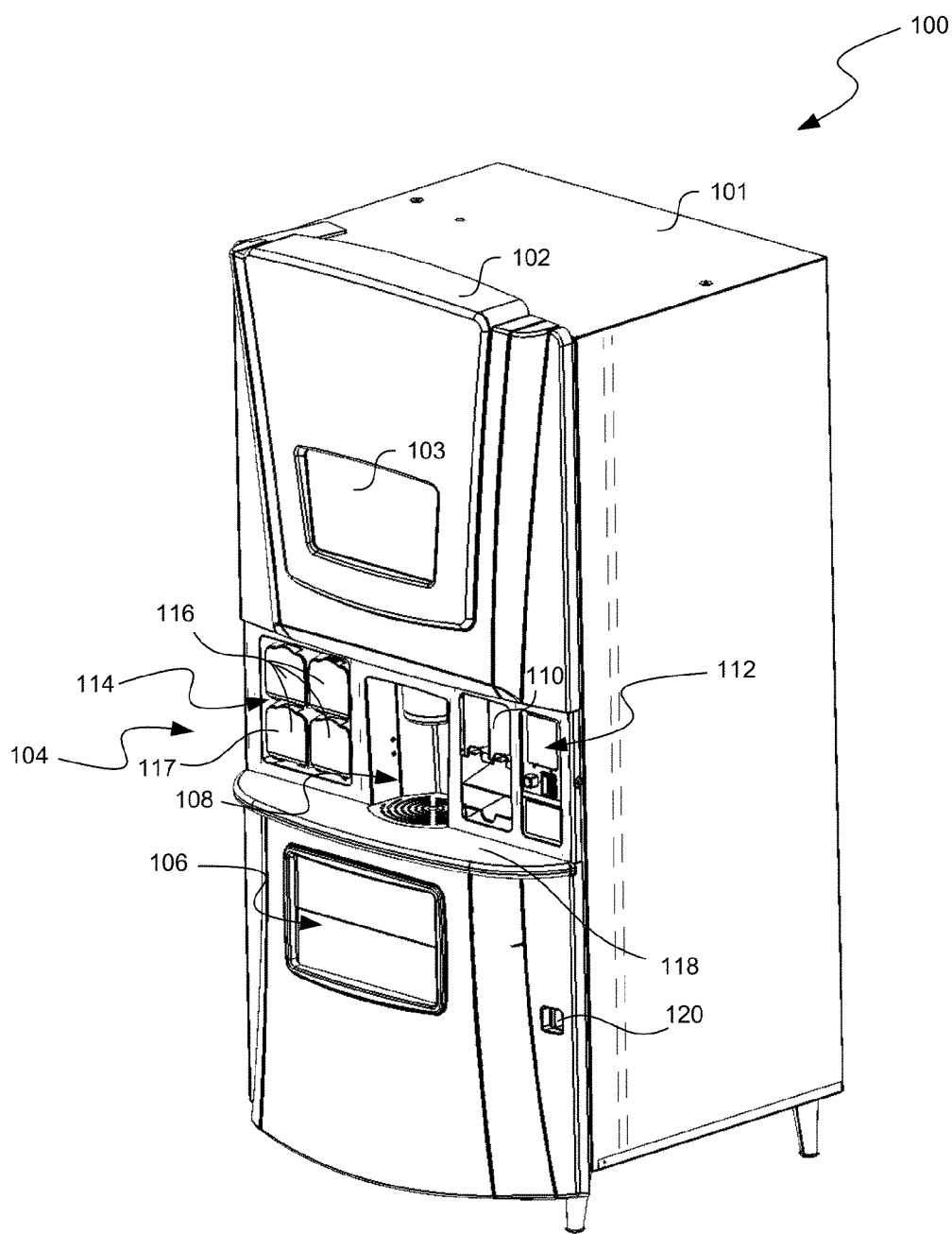
FIG. 1 is an isometric view of an automatic coffee vending kiosk configured in accordance with an embodiment of the present disclosure.

FIG. 1 is an isometric view of an automatic coffee vending kiosk 100 configured in accordance with an embodiment of the present disclosure. In the illustrated embodiment, the automatic coffee vending kiosk 100, hereinafter referred to as the "kiosk 100," is a machine for producing individually dispensed volumes of coffee or other hot beverages. The kiosk 100 includes a case 101 and a door or front panel 102 operably mounted to the case 101. The kiosk 100 also includes a display screen 103, a customer service portion 104 and a cup dispensing portion 106. The display screen 103 can be an LED display, an LCD display, or any other suitable screen, monitor or presentation device known in the art. In several embodiments, the display screen 103 can include user input capabilities, e.g., the display screen 103 can be a touch-screen or a multi-touch screen. The customer service portion 104 can include a variety of components for customer interaction and servicing. For example, the customer service portion can include a beverage dispensing portion 108, a sleeve dispenser 110, a payment and control portion 112, and a cup lid dispensing portion 114 having a plurality of lid dispensers 116. The beverage dispensing portion 108 can include a spout, valves, and/or other components for dispensing coffee or other beverages. A coin return chute 120 can be positioned to return rejected coins to a customer. In several embodiments, the case 101, the door 102, and/or portions thereof can be transparent and allow a user to view internal components and operations of the kiosk 100.

The lid dispensers 116 can include covers 117 (e.g., rotatable or sliding covers) that are positioned adjacent to a stack of cup lids contained in the kiosk 100. Containing the stacks of lids within the kiosk 100 can reduce access to the lids and increase the cleanliness of the lids. In one embodiment, each cover 117 can releasably secure a single lid from a corresponding stack, and a consumer can rotate the cover 117 to access and retrieve the lid. The cover 117 can be spring loaded and can return to its original position to releasably grasp a new lid. Accordingly, the lid dispensers 116 can deliver individual lids to consumers that have not been handled by other consumers. In several embodiments the lid dispensers 116 can be at least generally similar in structure and function: 1) to dispensers described in U.S. Pat. No. 7,207,462, which is incorporated herein by reference in its entirety; and/or 2) to "In-Counter LidSavers™" produced by Acry Fab, Inc., of Sun Prairie Wis. A counter 118 can be positioned adjacent to the customer service portion 104 to provide a space for the customer to temporarily place personal items or to support a beverage while the customer attaches a lid or a sleeve.

Figure 2:
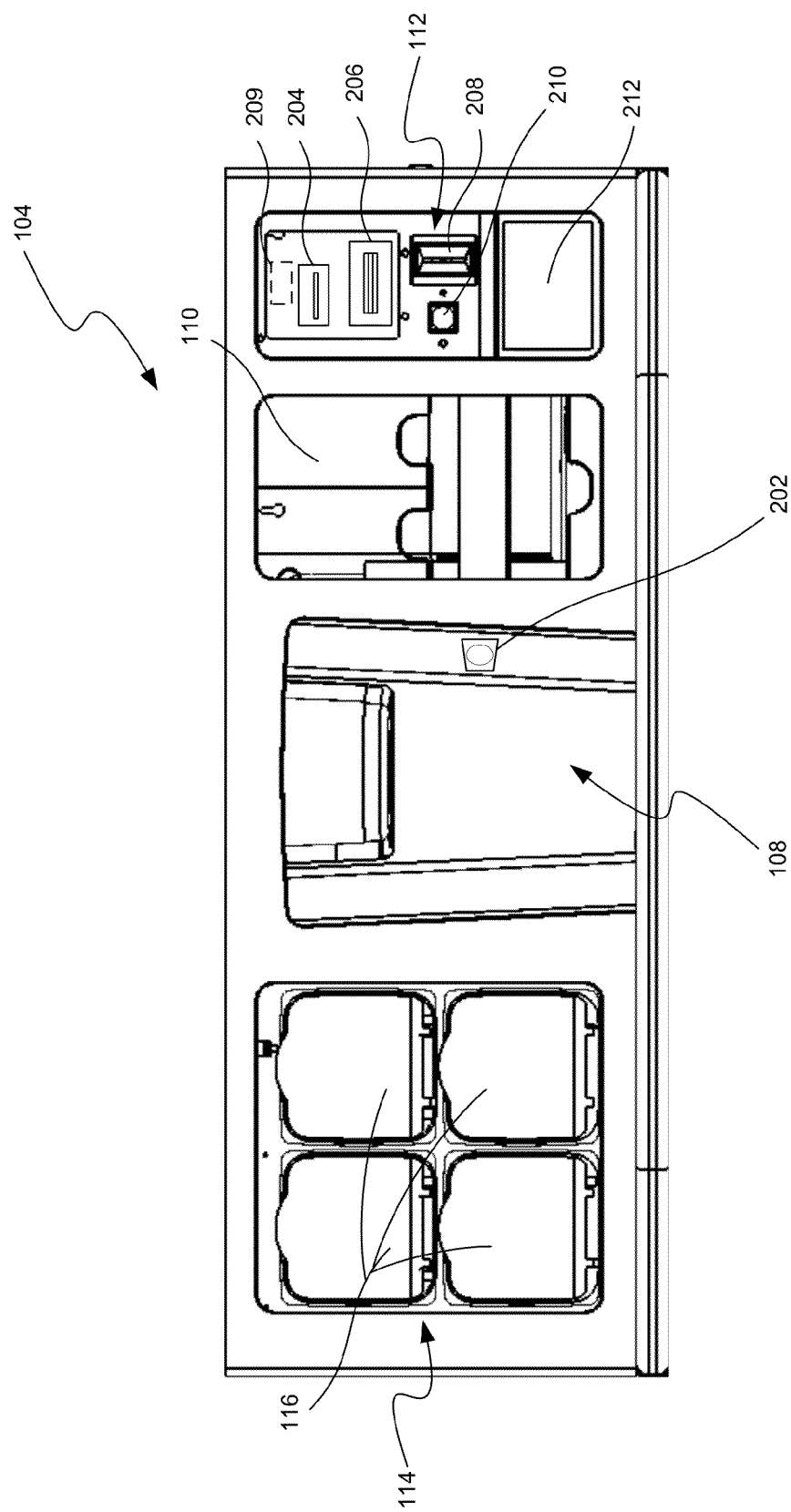
FIG. 2 is a front view of a customer service portion of an automatic coffee vending kiosk configured in accordance with an embodiment of the present disclosure.

FIG. 2 is a partially schematic front view of the customer service portion 104 configured in accordance with an embodiment of the present disclosure. In the illustrated embodiment, the beverage dispensing portion 108 includes a cup sensor 202 positioned to detect a consumer's cup or beverage receptacle. The cup sensor 202 can include one or more proximity sensors, motion detectors, or other suitable detection devices known in the art (e.g., infrared sensors, ultrasonic sensors, photocells, etc.) that can provide a signal to indicate that a cup is positioned to receive a beverage, as further described below. The payment and control portion 112 can include a variety of payment components, including: a card reader 204, a bill receiver 206, a coin receiver 208, a communication device 209, and a coin return button 210. A consumer can pay for beverages by inserting a credit card, debit card, loyalty card and/or other payment card into the card reader 204. Consumers can also pay for beverages by inserting cash into the bill receiver 206 and/or coins into the coin receiver 208. For payment via coins, the coin return button 210 can be depressed to release rejected coins.

The communication device 209 can include one or more transceivers for communication via cellular, Wi-Fi, near-field communication (NFC), Bluetooth, and/or other wireless communication protocols that can interact with consumer devices to receive payments and/or transfer other information or data. For example, in some embodiments, a consumer can pay for a beverage with a digital wallet or "e-wallet" associated with a mobile device (e.g., a mobile phone). Additionally, in some embodiments, payment can be made via email, text message, stored account information, and/or other electronic payment methods, including payment via a tablet, smart phone, or other device that can wirelessly communicate with the kiosk 100. The payment and control portion 112 also includes a control pad 212. In several embodiments, the control pad 212 can control the operation of the display screen 103. For example, the control pad 212 can be a touchpad that can move a pointer or mouse cursor on the display screen 103 to operate the kiosk 100.

Figure 3A:
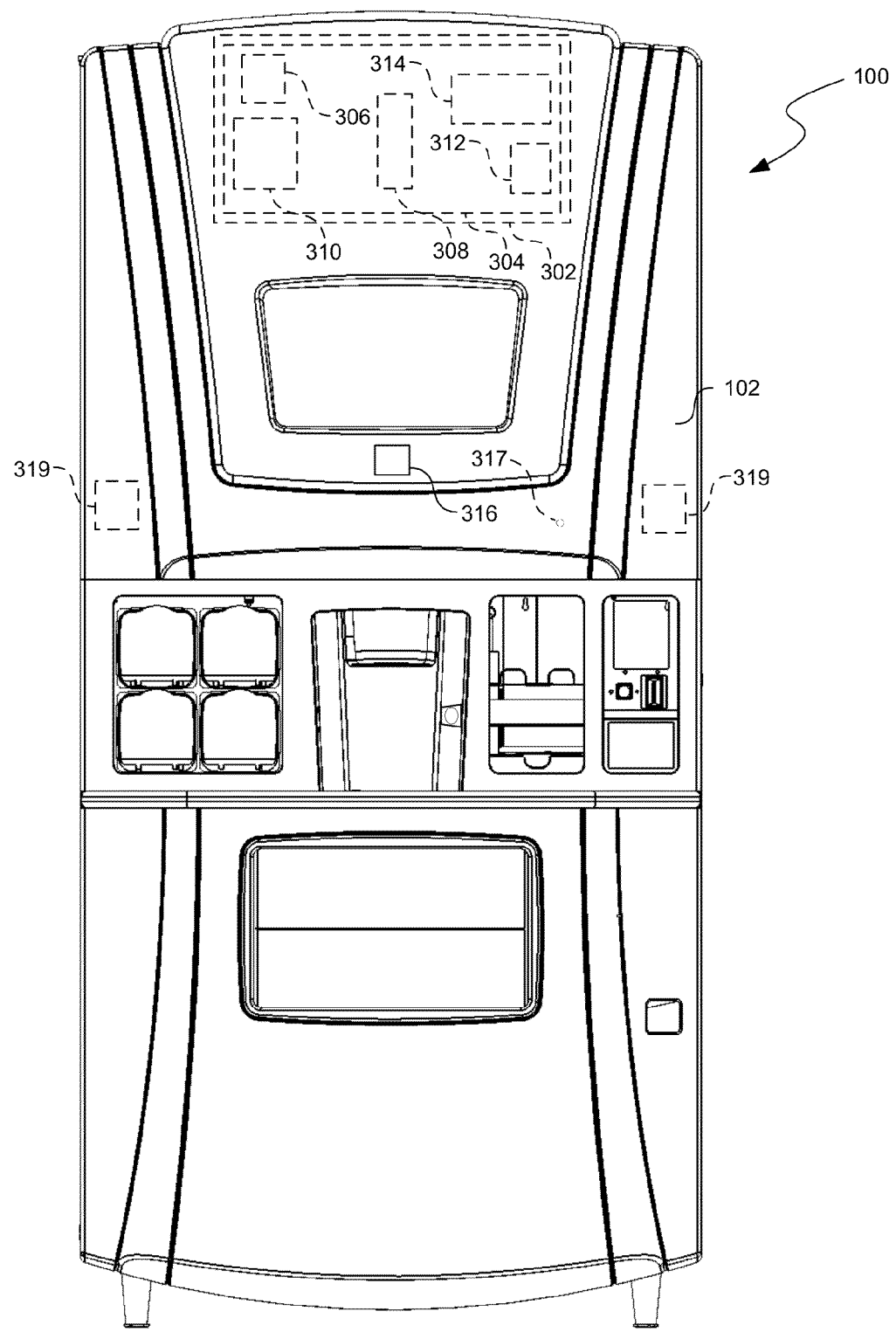
FIG. 3A is a partially schematic front view of an automatic coffee vending kiosk configured in accordance with an embodiment of the present disclosure.

FIG. 3A is a partially schematic front view of the automatic coffee vending kiosk 100 configured in accordance with an embodiment of the present disclosure. In the illustrated embodiment, the kiosk 100 includes a control unit 302 having a variety of components for control and operation of the kiosk 100. For example, the control unit 302 includes a main board 304, a central processing unit (CPU) 306, a data storage device or memory 308, a communication module 310, a graphics card 312 and a bus 314. The CPU 306 may be any logic processing unit, such as one or more CPUs, digital signal processors (DSPs), application-specific integrated circuits (ASIC), etc. The memory 308 can include read-only memory ("ROM") and random access memory ("RAM") and can store one or more computer-executable instructions for the operation of the kiosk 100. The communication module 310 can include a variety of suitable wired and/or wireless communication capabilities. For example, the communication module 310 can include one or more devices that provide wired network connections, e.g., network cards having Ethernet connectors, coaxial connectors, USB connectors, etc. Additionally, the communication module 310 can include one or more transceivers for communication via cellular, Wi-Fi, NFC, Bluetooth, and/or other wireless communication protocols.

In several embodiments, the communication module 310 can provide Wi-Fi signals to consumers or users to enable internet access or provide other functions. For example, the kiosk 100 can operate as a Wi-Fi hotspot via the communication module 310. In some embodiments, the associated wireless signals can be password protected and require a consumer to interact with the kiosk 100 or a website or other source to gain access. In other embodiments, the associated wireless signals can be open and not require a password.

The graphics card 312 can be integral with or connected to the main board 304, or to other components of the control unit 302, and can output images to the display screen 103. The bus 314 can provide connections from the control unit 302 to a variety of other components, e.g., brewing components, mixing components, ingredient hoppers, etc. In several embodiments, the control unit 302 and several other components for operation of the kiosk 100 can be attached to and/or positioned within the front panel 102. The positioning of control components within the front panel 102 can provide easy access for repair, adjustment and/or replacement, and can increase the available space for drink making components within the case 101.

The kiosk 100 can include a consumer sensor 316 (e.g., an infrared sensor, an RFID reader, an NFC device, etc.) to detect consumers and initiate one or more actions. For example, the sensor 316 can include a motion detector that detects the movement of a consumer nearby and sends a signal to the control unit 302 to initiate the display of a video or other advertisement on the display screen 103. In some embodiments, the sensor 316 can include Bluetooth or NFC capabilities and can recognize the proximity of a consumer via a consumer device (e.g., a mobile phone). Additionally, the kiosk 100 can include one or more microphones 317 and speakers 319. Although particular components are shown in the illustrated embodiments, the kiosk 100 can include a variety of additional electrical or computer components configured to control and operate the kiosk 100 and known in the art.

Figure 3B:
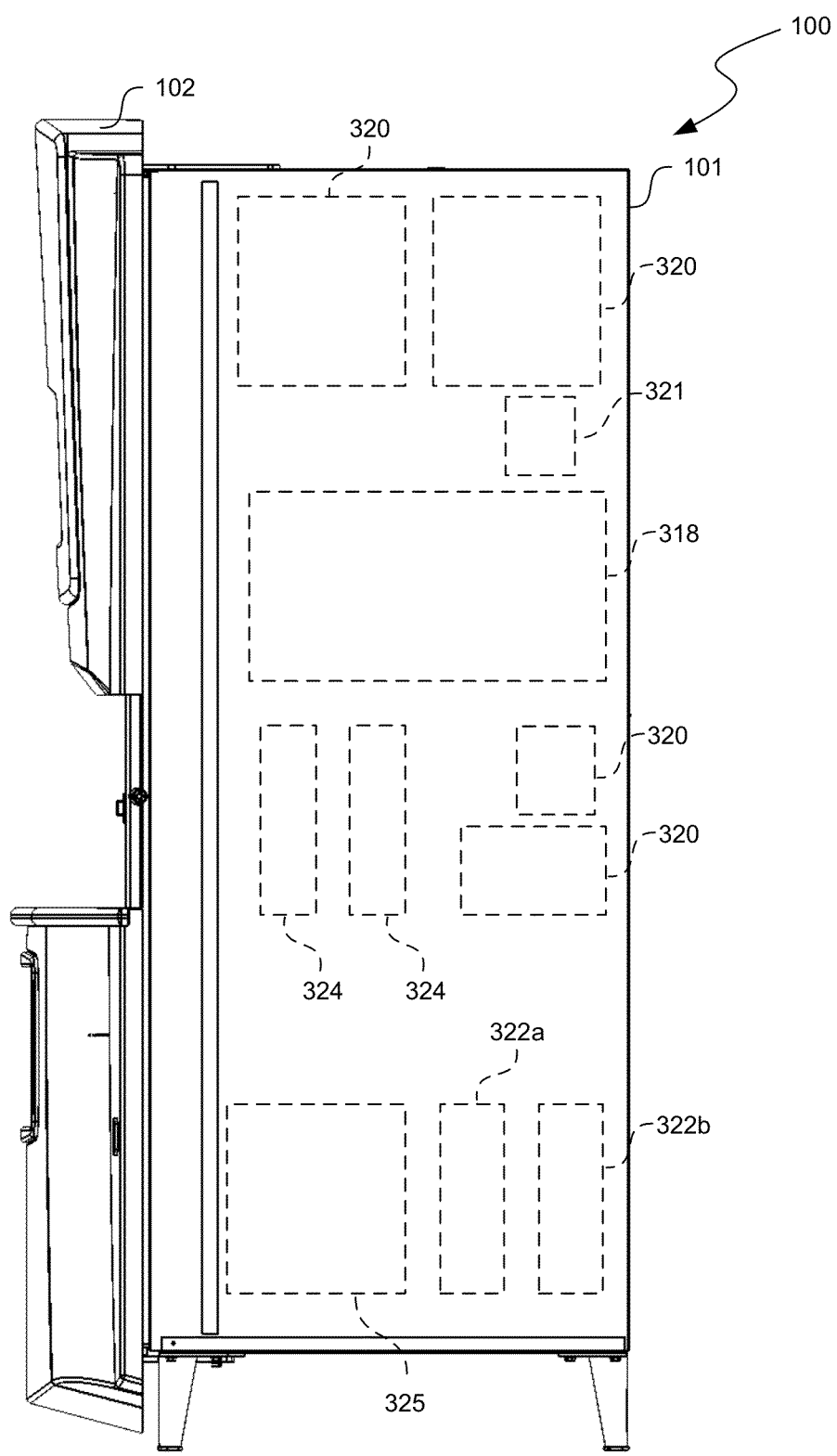
FIG. 3B is a partially schematic side view of an automatic coffee vending kiosk configured in accordance with an embodiment of the present disclosure.

FIG. 3B is a partially schematic side view of the kiosk 100 configured in accordance with an embodiment of the present disclosure. In the illustrated embodiment, the kiosk 100 includes a variety of components for the preparation of coffee and other hot beverages. For example, the kiosk 100 includes a brewing unit 318, a grinder 321, a plurality of ingredient hoppers 320, a first boiler 322$a$ and a second boiler 322$b$ (collectively the boilers 322), and a plurality of mixers or blenders 324. These and several additional components known in the art of coffee and beverage preparation can be operably coupled to the control unit 302 for the preparation of coffee and/or other hot beverages. For example, the grinder 321 can grind coffee beans from one of the ingredient hoppers 320 and deliver ground coffee to the brewing unit 318. One or more of the boilers 322 can deliver heated water to the brewing unit 318 and the brewing unit 318 can brew coffee. The coffee and one or more additional ingredients can be delivered to one of the blenders 324 for mixing and subsequent delivery to a consumer via the beverage dispensing portion 108.

The kiosk 100 can include any suitable number of ingredient hoppers 320 that can contain a variety of ingredients or condiments for preparing beverages. In some embodiments, the kiosk 100 can include 20 or more ingredient hoppers 320 of varying sizes. The ingredient hoppers 320 can contain, for example, coffee beans, sugar, low-calorie sweetener, creamers (including liquid or condensed creamers), milk (including liquid or condensed milk), cocoa powders, syrups, and/or a variety of other suitable ingredients or condiments.

The boilers 322 can provide water at a plurality of different temperatures to ensure that beverages are delivered to a consumer at a particular temperature. For example, drinks that do not require brewing (e.g., hot chocolate) provide less time for the water to cool as it travels from the brewer to the beverage dispensing portion 108 and a consumer's cup. Accordingly, water for brewed drinks can be provided at a higher temperature than that for non-brewed drinks. In one embodiment, the first boiler 322$a$ can provide water for non-brewed drinks at a first temperature, and the second boiler 322$b$ can provide water for brewed drinks at a second temperature, higher than the first temperature. In several embodiments, the kiosk 100 can include a plurality of valves that can operate to mix water from one or more boilers 322 to provide water at a desired temperature.

The kiosk 100 can further include a heating, ventilation and air conditioning (HVAC) system 325. The HVAC system 325 can monitor and control the environmental conditions (e.g., temperature and humidity) within the kiosk 100. Maintaining the temperature and humidity within desired ranges can increase the consistency of beverages produced by the kiosk 100, reduce equipment malfunctions and failures, and help maintain the quality and freshness of ingredients.

Several of the components described herein can be modular and can be quickly removed from the kiosk 100 for service or replacement. For example, the boilers 322, the brewing unit 318, the HVAC system 325, the ingredient hoppers 320 and/or other components can be self-contained and removably coupled to the kiosk 100 in a manner that permits relatively quick replacement. For example, quick release mechanisms and fasteners, rail mounting systems, and/or other components known in the art can attach components to the kiosk 100.

Referring to FIGS. 1-3B together, in operation, the kiosk 100 can provide a variety of coffee or other hot beverages to a consumer. The control unit 302 and/or other components can control the operation of the kiosk 100 to interact with the consumer and provide a requested beverage. For example, the control unit 302 can include computer executable instructions that can direct the display screen 103 to display one or more menus having a variety of coffee drinks, hot beverages, and customizable options. A consumer can interact with the display screen 103 and/or the control pad 212 to view the available items and options, and select a particular beverage. The display screen 103 can indicate the price of the selected beverage and a variety of payment options available to the consumer. The consumer can choose a payment option and pay for the beverage via interactions with the payment and control portion 112. In several embodiments, upon payment, the cup dispensing portion 106 can provide access to a cup within the kiosk 100, as will be further described below. The display screen 103 can provide instructions to the consumer via pictures, animations and/or videos. For example, an animation can instruct the user to retrieve a cup from the cup dispensing portion 106 and place the cup in the beverage dispensing portion 108. The cup sensor 202 can detect the cup and send a signal to the control unit 302 indicating the cups presence. The control unit 302 can direct the operation of components within the case 101 (e.g., the boilers 322, the brewing unit 318, etc.) to prepare the selected beverage and dispense the beverage via the beverage dispensing portion 108.

The display screen 103 can provide a variety of selectable beverage options, and a consumer can select particular options via interaction with the display screen 103, as further described below. Additionally, the display screen 103 can present pictures, animations and/or videos to a consumer. For example, in one embodiment, as the kiosk 100 brews and prepares a coffee beverage for a consumer, the display screen 103 can present an animation of the brewing and preparation of the coffee beverage. Pictures, animations and/or videos presented by the display screen 103 can include various steps of the beverage creation, e.g., grinding of coffee beans, brewing of coffee, frothing of milk, mixing of ingredients, pouring of the beverage, etc. The speakers 319 can broadcast sound that accompanies presentations on the display screen 103. For example, the sound of coffee beans being ground can accompany an associated video presentation of coffee grinding. In some embodiments, the microphone 317 can monitor audible sounds within the kiosk 100 (e.g., coffee grinding) and the sound can be broadcast through the speakers 319. Furthermore, the display screen 103 can present promotions, advertising, surveys, personal messaging (e.g., offers or notifications directed to a particular consumer) and/or other suitable content. In several embodiments, dynamic messaging can be presented to a consumer. For example, messages can be directed to a consumer based on their current interaction with the kiosk 100. In one example, messages can be directed to the consumer offering a discount on a subsequent purchase of an additional drink.

Figure 4A:
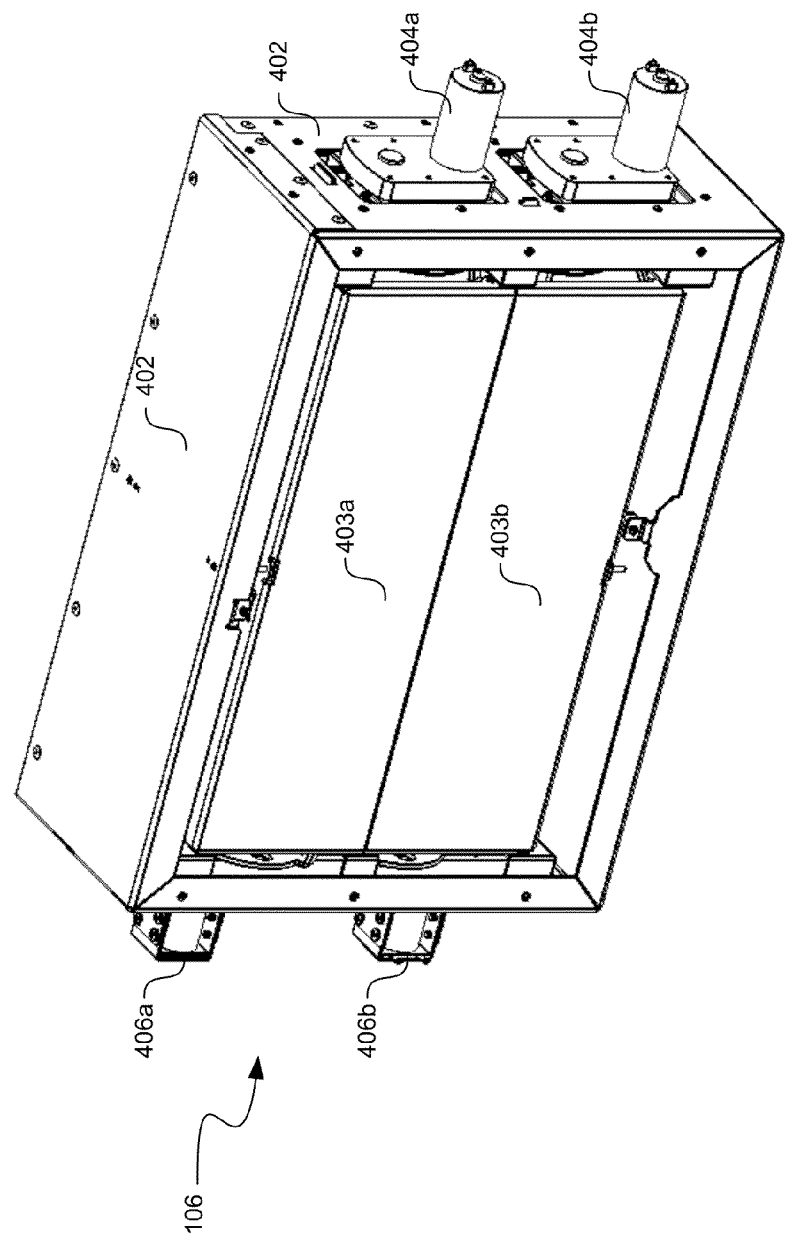
FIGS. 4A, 4B, 4C, 4D, and 4E are a series of isometric views of a cup dispensing portion of an automatic coffee vending kiosk in various stages of operation, configured in accordance with an embodiment of the present disclosure.
Figure 4B:
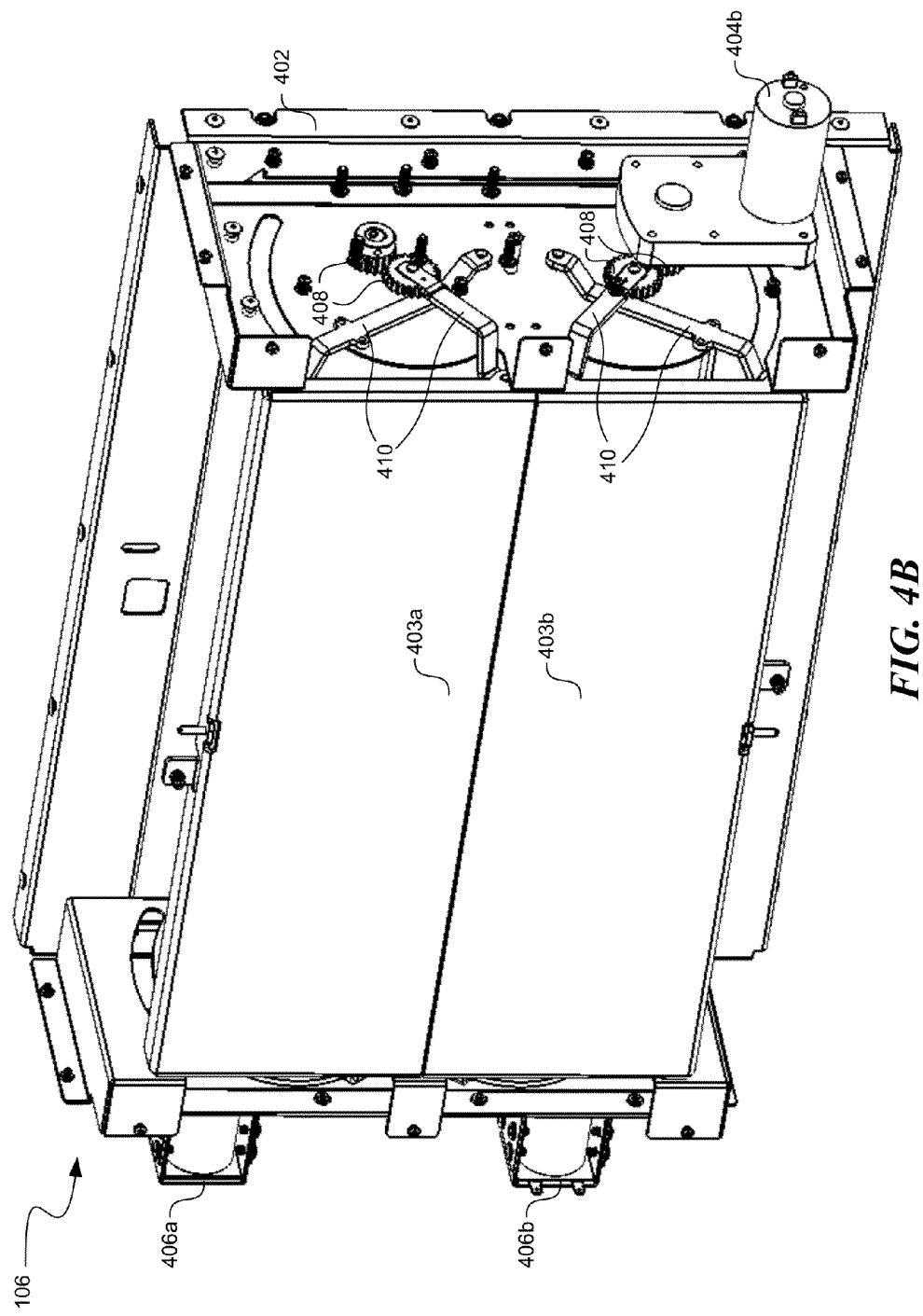

FIG. 4A is an isometric view of the cup dispensing portion 106 configured in accordance with an embodiment of the present disclosure. In the illustrated embodiment, the cup dispensing portion 106 includes a frame 402 that can be mounted within the kiosk 100 adjacent to the front panel 102 (FIG. 1). A first panel or door 403a and a second panel or door 403b (collectively the panels or doors 403); a first motor 404a and a second motor 404b (collectively the motors 404); and a first solenoid 406a and a second solenoid 406b (collectively the solenoids 406) can be operably coupled to the frame 402. The control unit 302 (FIG. 1) can be operably coupled to the motors 404 and the solenoids 406 to control the operations thereof in response to user interactions with the kiosk 100. FIG. 4B is an isometric view of the cup dispensing portion 106 with a portion of the frame 402 removed to illustrate additional components. A plurality of gears 408 and linkages 410 can operably couple the motors 404 to their corresponding doors 403.

Figure 4C:
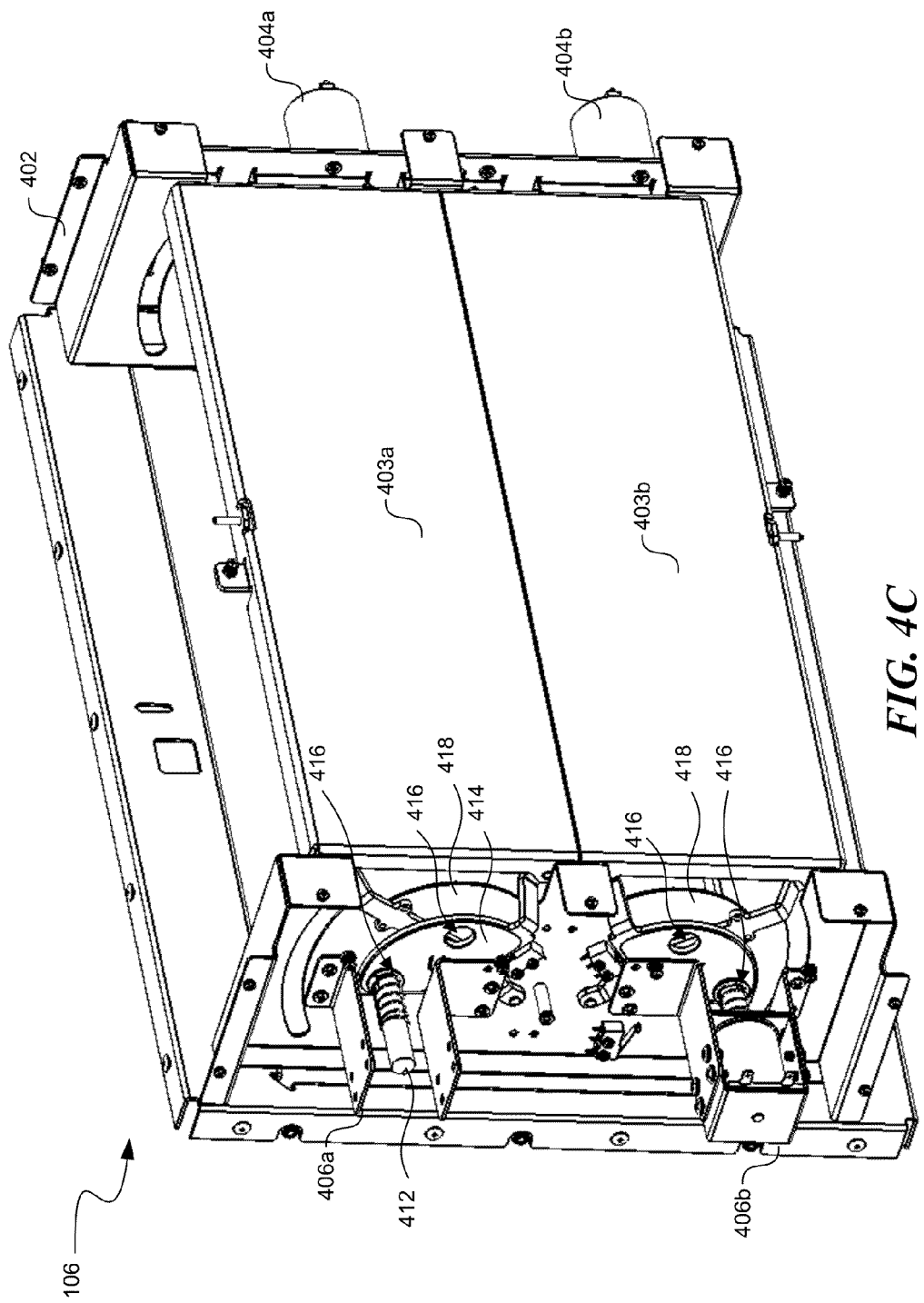
Figure 4D:
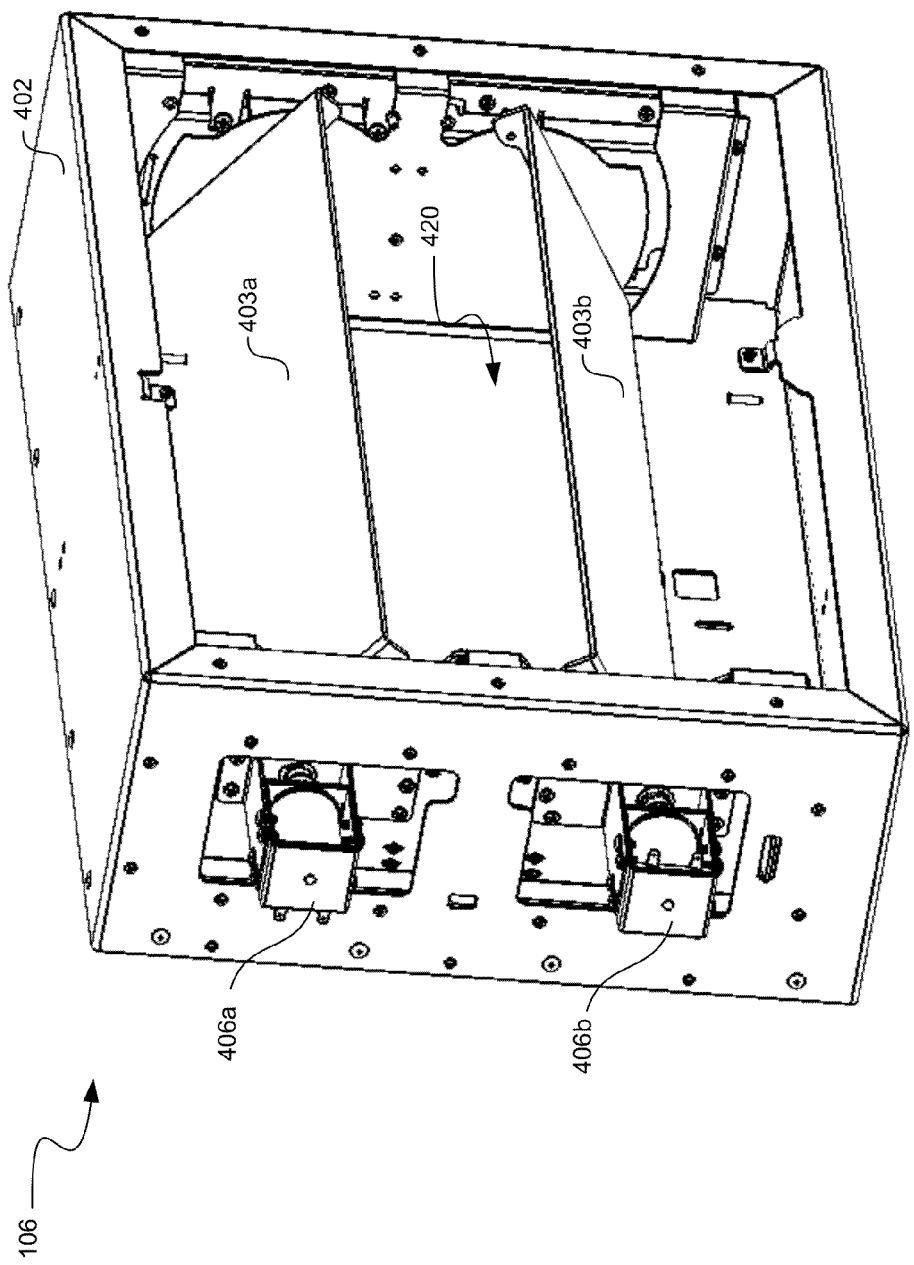
Figure 4E:
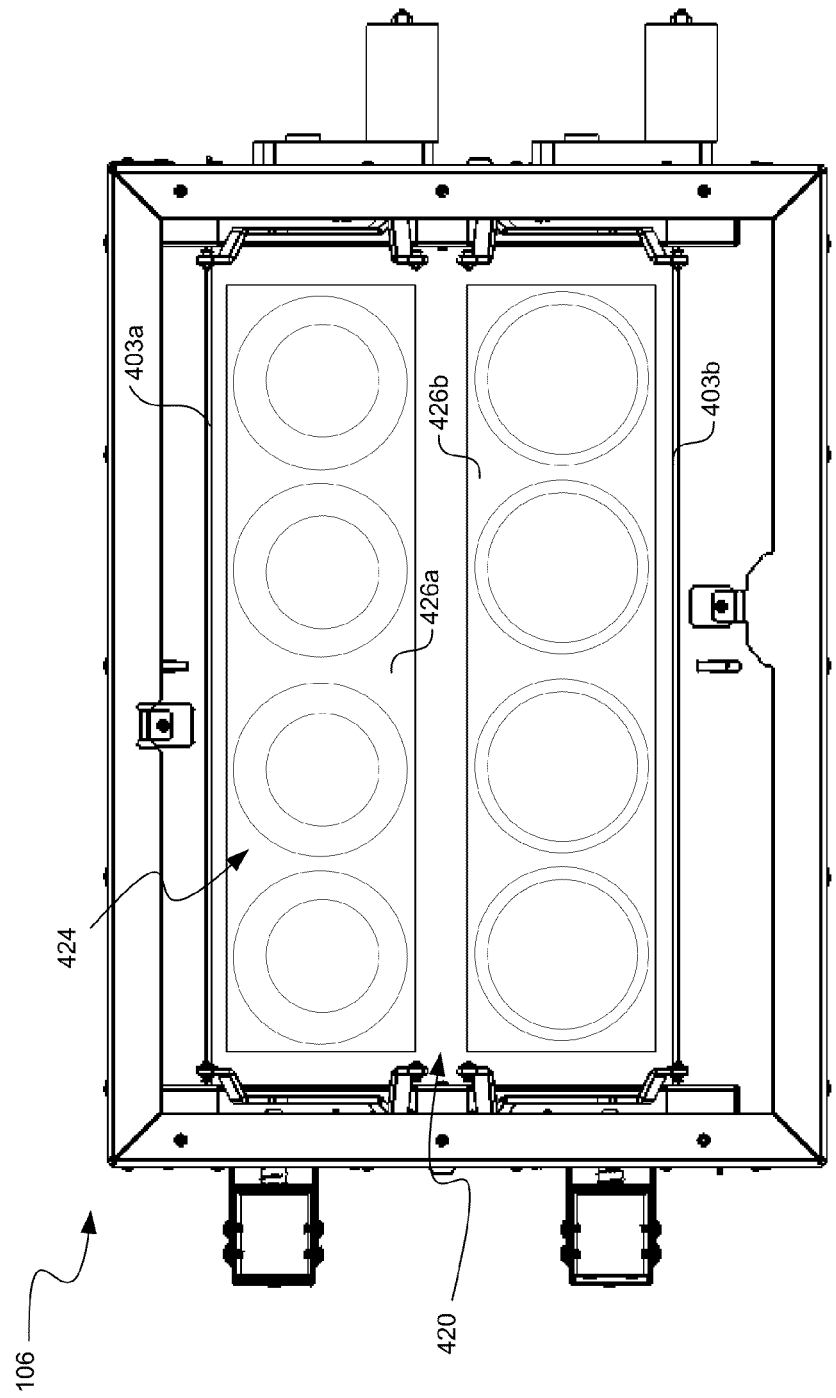

FIG. 4C is an isometric view of the cup dispensing portion 106 with a portion of the frame 402 and a portion of the first solenoid 406a removed to illustrate additional components. Rotatable plates 418 having openings 416 can be operably coupled to the doors 403 and positioned adjacent to the solenoids 406. The solenoids 406 can include cores 412 positioned to engage the rotatable plates 418 via the openings 416 and lock the doors 403 in a variety of positions. FIG. 4D is an isometric view of the cup dispensing portion 106 illustrating the doors 403 in a partially open position. A cup storage area 420 adjacent the doors 403 can store a plurality of cups. In several embodiments, cup holders having a variety of rows, tubes, or other cup holding structures can support and/or align a plurality of cups within the cup storage area. FIG. 4E is a front view of the cup dispensing portion 106 having a cup holder 424 configured in accordance with an embodiment of the present disclosure. In the illustrated embodiment, the cup holder 424 includes a first row 426a having a plurality of stacks of cups of a first size (e.g., medium), and a second row 426b having a plurality of cups of a second size (e.g., large). In operation, referring to FIGS. 4A-4E together, the motors 404 and the solenoids 406 can operate to open, close, lock, and unlock the doors 403. In particular, the solenoids 406 can be energized to remove the cores 412 from the rotatable plates 418, and the motors 404 can be operated to rotate the doors 403 between a first or closed position that blocks access to the cup storage area 420 and a second or open position that allows access to the cup storage area 420.

The first motor 404a and the first solenoid 406a can operate to independently move the first door 403a; and the second motor 404b and the second solenoid 406b can operate to independently move the second door 403b. For example, in several embodiments, a plurality of cups of a first size can be positioned within the kiosk 100 adjacent to the first door 403a, and a plurality of cups of a second size, different than the first size, can be positioned within the kiosk 100 adjacent to the second door 403b. In response to a consumer ordering and paying for a drink of the first size, the first motor 404a and the first solenoid 406a can operate to open the first door 403a. Similarly, In response to a consumer ordering and paying for a drink of the second size, the second motor 404b and the second solenoid 406b can operate to open the second door 403b. Accordingly, the kiosk 100 can selectively provide access to an appropriate sized cup for a consumer's order. Additionally, the doors 403 can be secured in the closed position by the solenoids 406. Specifically, the cores 412 of the solenoids 406 can releasably lock the doors 403 in the closed position by preventing the rotation of rotatable plates 418. Accordingly, the kiosk 100 can prevent access to any cups until a consumer has ordered and paid for a beverage. The doors 403 of the cup dispensing portion 106 can reduce customer access to the cups and thereby increase the cleanliness of the cups. Additionally, the restricted access to cups provided by the cup dispensing portion 106 can reduce theft and waste, and can result in a corresponding reduction in the cost to operate the kiosk 100.

Although the embodiments described above can include payment occurring after a drink selection, in some embodiments, a user can make a payment or authorize a payment prior to selecting a drink. For example, in several embodiments, a user can utilize a loyalty card, credit card, bank card, or other payment device prior to selecting a beverage. In some embodiments, the kiosk 100 can recognize the user via a payment device (e.g., a credit card, e-wallet, etc.). Accordingly, in some embodiments, the doors 403 can be opened upon selection of a beverage, rather than upon payment for a beverage.

In several embodiments, the motors 404 can operate in a manner to reduce the opportunity for objects to become lodged or stuck between the doors 403. For example, the control unit 302 can operate the motors 404 sequentially, e.g., first partially shutting one or both of the doors 403, and then subsequently fully shutting one or both of the doors 403.

Although the illustrated embodiments of FIGS. 4A-4E include the motors 404 and the solenoids 406 to operate the doors 403, other embodiments can include other components to operate the doors 403. For example, embodiments in accordance with the present technology can include one or more solenoids alone, or one or more motors alone to operate one or more doors that provide access to a cup storage area. Furthermore, alternative mechanical or electromechanical components can be used to operate doors or other components that provide access to a cup storage area. For example, hydraulic, pneumatic, piezoelectric and/or other components can provide for the motion of one or more panels or doors that provide access to a cup storage area. Additionally, although the illustrated embodiments include generally rectangular and flat blocking devices or doors 403 that can control access to the cup storage area 420, other embodiments can include other shapes of doors or panels and/or other blocking devices or components to control access. For example, rounded, curved or other suitably shaped panels or doors can control access. Similarly, grates, bars, cables and/or other components can be used in a variety of embodiments to control access to a cup storage area.

Figure 5A:
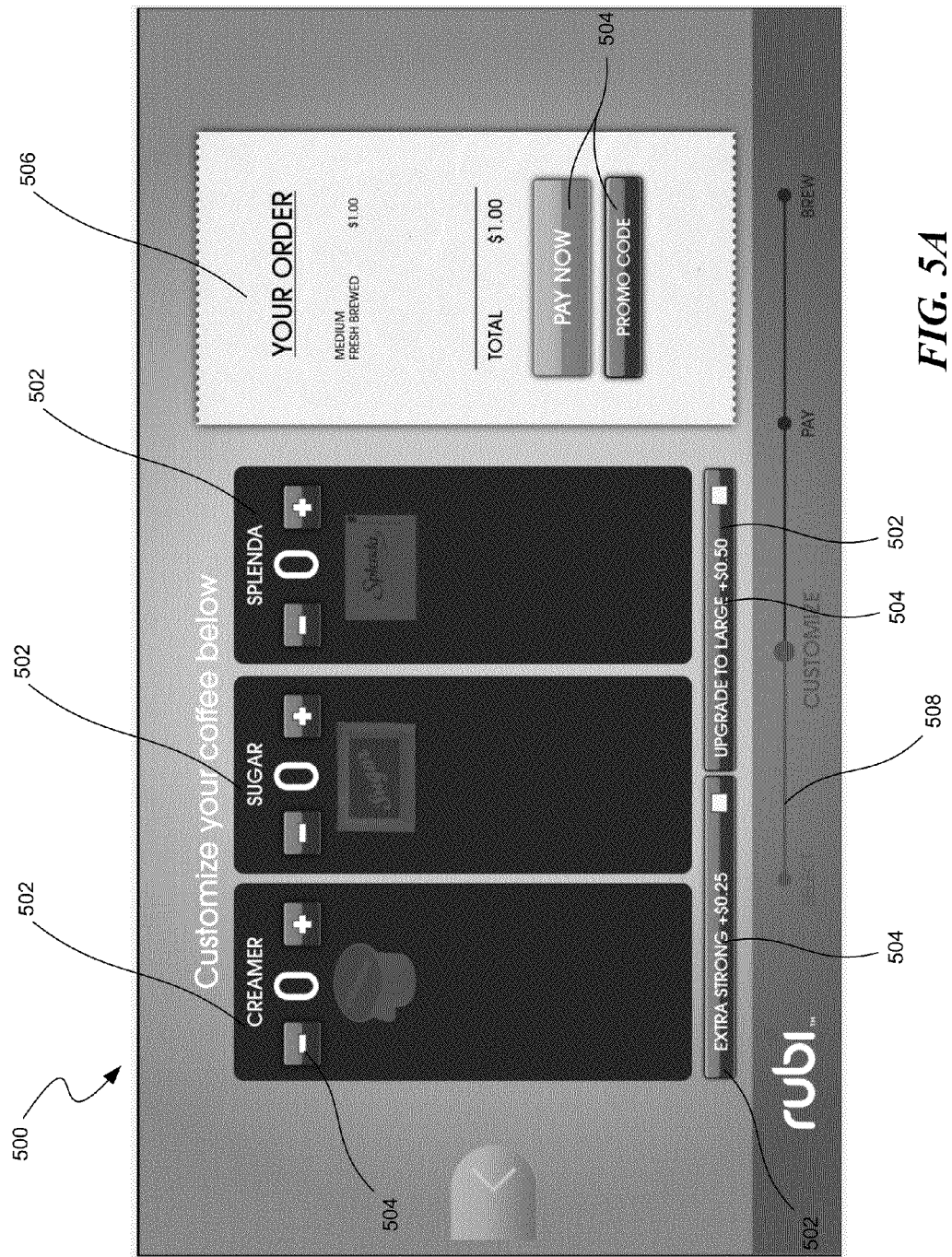
FIGS. 5A and 5B are graphical representations of display screens for automatic coffee vending kiosks configured in accordance with embodiments of the present disclosure.
Figure 5B:
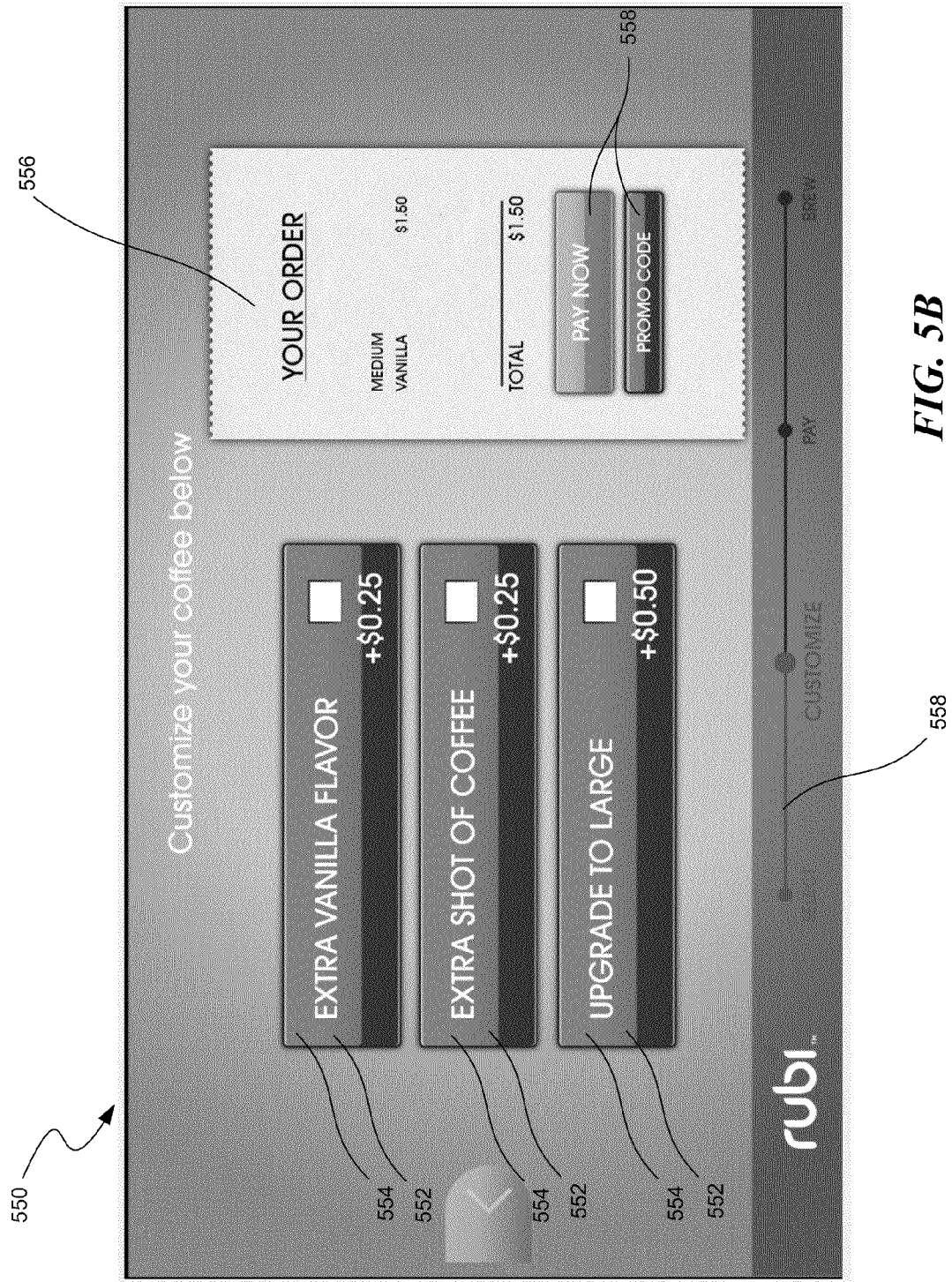

FIGS. 5A and 5B are graphical representations of display screens for automatic coffee vending kiosks configured in accordance with embodiments of the present disclosure. In the illustrated embodiment of FIG. 5A, a graphical user interface (GUI) 500 includes a plurality of ingredient or size options 502. Multiple user selectable buttons 504 can allow a user to select from the various ingredient or size options 502 to customize their drink. A payment portion 506 can include one or more user selectable buttons 504 that enable payment for a selected beverage, or provide for the entry of a promotional code. Several embodiments in accordance with the present technology can include promotional codes as a payment form. For example, promotional codes can be distributed to consumers via text message, email, paper slips, web pages and/or a variety of other suitable means. The consumer can enter the promotional code to pay for all or a portion of a selected beverage. A status bar 508 can indicate to a consumer the status of their particular order.

FIG. 5B illustrates a GUI 550 configured in accordance with an embodiment of the present disclosure. In the illustrated embodiment, the GUI 550 includes several features at least generally similar to the GUI 500. For example, the GUI 550 includes a plurality of ingredient or size options 552 and multiple user selectable buttons 554 for the various ingredient or size options 552. Similarly, a payment portion 556 can include one or more user selectable buttons 554 that enable payment or provide for the entry of a promotional code, and a status bar 558 can indicate the status of an order. Although the illustrated embodiments of FIGS. 5A and 5B include the GUIs 500 and 550, embodiments in accordance with the present technology can include a variety of GUIs presenting a variety of information and having a variety of suitable user selectable options. For example, in several embodiments, a GUI on the display screen 103 can advertise a loyalty program and/or allow a user to sign up for the loyalty program. Additionally, the GUI can provide for payment via a user's loyalty program account. For example, the user can log in to their loyalty account via the display screen 103 and one of the payment options can include value stored in the loyalty account or a promotional offer connected to the loyalty account.

Figure 6:
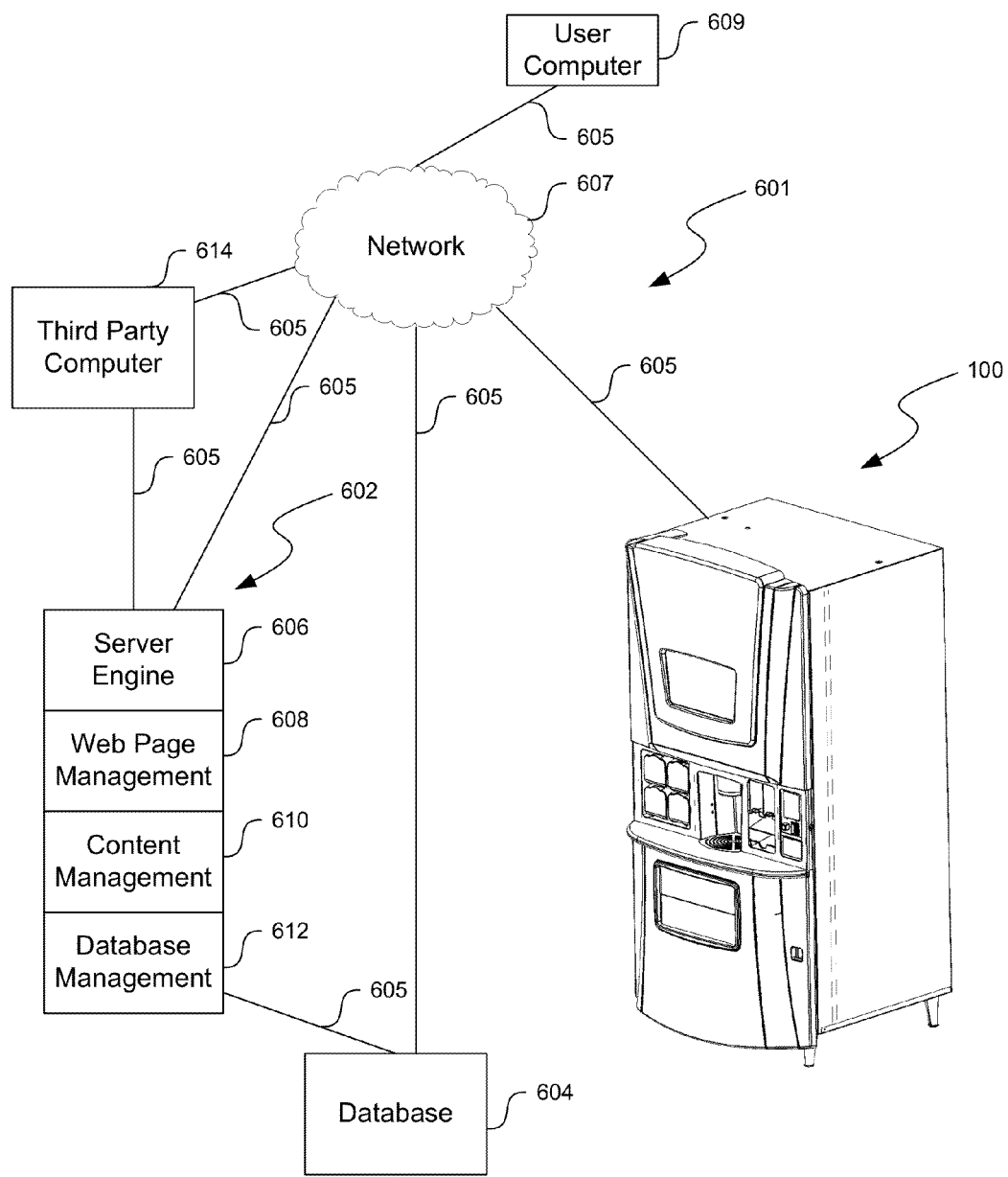
FIG. 6 is a schematic diagram of a suitable computing environment in which various aspects of automated coffee vending kiosks can be operated in accordance with embodiments of the present disclosure.

FIG. 6 is a schematic diagram of a suitable computing environment 601 in which various aspects of the automated coffee vending kiosks described herein can be operated in accordance with embodiments of the present disclosure. The computing environment 601 includes one or more server computers 602 and one or more databases 604 that can be connected to the kiosk 100 via wired or wireless communication links 605 and/or a network 607 (e.g., the internet). The server computer 602 can include a server engine 606, a web page management component 608, a content management component 610, and a database management component 612. In various embodiments, the server computer 602 can perform a variety of functions to operate and control one or more kiosks 100. For example, the web page management component 608 can handle the creation, display and/or routing of web or other display pages related to the kiosk 100. In some embodiments, users can access web pages to make payments for beverages, to receive promotional codes, to learn the location of one or more kiosks 100, etc.

The server computer 602 can allow monitoring and control of one or more kiosks 100. For example, operating instructions, menu and advertising content, and/or other content can be uploaded to the kiosk 100 via the server computer 602. In some embodiments, one or more user computers 609 (e.g., personal computers, laptops, tablets, etc.) can access and control or update the kiosk 100 via the network 607. In several embodiments, menus can be updated seasonally. For example, pumpkin flavored options can be added and/or featured more prominently in autumn. Additionally, maintenance routines, cleaning cycles, or other functions of the kiosk 100 can be initiated via the server computer 602 or the user computer 609 through the network 607. Although the illustrated embodiments include the server computer 602 and the user computer 609 connecting to the kiosk 100 via the network 607, in several embodiments the server computer 602 and the user computer 609 can connect to the kiosk 100 directly via a wired or wireless communication link.

In several embodiments, the kiosk 100 can be monitored to determine ingredient usage, payment receipts, coin and/or cash levels, equipment status, etc. Additionally, in some embodiments, payment receipts, cash and/or coin levels, and/or any other suitable information can be transmitted to a third party computer 614. For example, in several embodiments, data on coin and/or cash levels can be transmitted to an armored car service provider (e.g., Loomis or Brinks). The data can be transmitted via email or any other suitable electronic format and can operate as a receipt that verifies a particular amount of money has been or will be transferred to the third party computer 614. In some embodiments, the kiosk 100 can transmit data to the third party computer 614 to provide notification that maintenance is required or ingredients need to be added or refilled.

The kiosk 100 can include a variety of features to enable operation by consumers having disabilities. Specifically, in several embodiments, the kiosk 100 can be configured to comply with the Americans with Disabilities Act (ADA). For example, the counter 118 and the control pad 212 can be positioned at heights that are accessible to wheelchair bound consumers. In some embodiments, the counter 118 can be positioned at approximately 34 inches (86 centimeters) from the bottom of the kiosk 100.

From the foregoing it will be appreciated that specific embodiments of the invention have been described herein for purposes of illustration, but that various modifications may be made without deviating from the spirit and scope of the various embodiments of the invention. Moreover, while various advantages and features associated with certain embodiments have been described above in the context of those embodiments, other embodiments may also exhibit such advantages and/or features, and not all embodiments need necessarily exhibit such advantages and/or features to fall within the scope of the disclosure. Accordingly, the invention is not limited, except as by the appended claims.

We claim:

1. An automated coffee vending kiosk for dispensing coffee, the kiosk comprising:
 a coffee brewing unit configured to brew coffee;
 a cup dispensing portion including:
  a first motor;
  a first door operably coupled to the motor and moveable between a closed position and an open position;
  a cup storage area configured to store a first plurality of cups of a first size and a second plurality of cups of a second size, different than the first size, within the kiosk and adjacent to the door, wherein the first motor is operable to move the first door to the open position to provide access to the first plurality of cups;
  a second motor; and
  a second door operably coupled to the motor and moveable between a closed position and an open position, wherein the second motor is operable to move the second door to the open position to provide access to the second plurality of cups; and a coffee dispensing portion positioned to dispense the coffee into an individual cup.

2. An automated coffee vending kiosk for dispensing coffee, the kiosk comprising:
 a coffee brewing unit configured to brew coffee;
 a cup dispensing portion having a storage area for a plurality of cups and a blocking device comprising a rotatable door, wherein the blocking device is moveable between a first position blocking access to the plurality of cups and a second position allowing access to the cups;
 a coffee dispensing portion configured to dispense the coffee;
 a motor operably coupled to the door and configured to rotate the door between the first position and the second position; and
 a solenoid operable to releasably lock the door in the first position.

3. An automated coffee vending kiosk for dispensing coffee, the kiosk comprising:
 a coffee brewing unit configured to brew coffee;
 a cup dispensing portion having a storage area for a plurality of cups:
  a first blocking device, wherein the first blocking device is moveable between a first position blocking access to the plurality of cups and a second position allowing access to the cups;
  a second blocking device moveable between a first position blocking access to the plurality of cups and the second position allowing access to the plurality of cups; and
  a coffee dispensing portion configured to dispense the coffee.

4. The kiosk of claim 3 wherein the plurality of cups includes a first plurality of cups of a first size and a second plurality of cups of a second size, different than the first size, and wherein the first blocking device is moveable to provide access to the first plurality of cups and the second blocking device is moveable to provide access to the second plurality of cups.

* * * * *